(12) United States Patent
Lefebvre et al.

(10) Patent No.: US 9,473,829 B2
(45) Date of Patent: Oct. 18, 2016

(54) METHODS AND DEVICES FOR SELECTIVE FORMAT-PRESERVING DATA ENCRYPTION

(75) Inventors: Frédéric Lefebvre, Rennes (FR);
Séverine Baudry, Rennes (FR);
Antoine Robert, Mezieres sur Couesnon (FR); Philippe Roudot, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 13/611,837

(22) Filed: Sep. 12, 2012

(65) Prior Publication Data

US 2013/0064368 A1  Mar. 14, 2013

(30) Foreign Application Priority Data

Sep. 12, 2011 (EP) ..................... 11306136

(51) Int. Cl.
| H04N 7/167 | (2011.01) |
| H04N 21/845 | (2011.01) |
| H04N 21/2389 | (2011.01) |
| H04N 21/2362 | (2011.01) |
| H04N 21/434 | (2011.01) |
| H04N 21/4385 | (2011.01) |

(52) U.S. Cl.
CPC ........ *H04N 21/845* (2013.01); *H04N 21/2362* (2013.01); *H04N 21/2389* (2013.01); *H04N 21/23895* (2013.01); *H04N 21/4345* (2013.01); *H04N 21/4385* (2013.01); *H04N 21/43853* (2013.01)

(58) Field of Classification Search
None
See application file for complete search history.

(56) References Cited

U.S. PATENT DOCUMENTS

| 7,218,738 | B2 | 5/2007 | Pedlow, Jr. et al. | |
| 7,478,238 | B2 | 1/2009 | Hooper et al. | |
| 7,926,083 | B2* | 4/2011 | Lecomte | H04N 7/1675 382/232 |
| 2006/0165232 | A1* | 7/2006 | Burazerovic | H04K 1/00 380/37 |
| 2008/0010653 | A1* | 1/2008 | Ollikainen | H04N 7/1675 725/25 |
| 2008/0085000 | A1 | 4/2008 | Candelore et al. | |
| 2011/0188652 | A1 | 8/2011 | Yamaguchi et al. | |
| 2012/0291061 | A1* | 11/2012 | Lecomte | H04N 7/1675 725/31 |

FOREIGN PATENT DOCUMENTS

| EP | 2161930 | 3/2010 |
| JP | 9233455 | 9/1997 |

(Continued)

OTHER PUBLICATIONS

European Search Report dated Feb. 10, 2012.

(Continued)

*Primary Examiner* — Andrew Nalven
*Assistant Examiner* — Quy Pham
(74) *Attorney, Agent, or Firm* — Myers Wolin LLC

(57) ABSTRACT

Selective data encryption of a file, in particular an H.264/MPEG-4 AVC data stream. If a first unit in the data stream is to be encrypted, it is encrypted and the encryption is put into a further unit, preferably in the data stream. A substitution unit is generated and put in the place of the first unit; if necessary, at least one header value is taken from the first unit for use in the substitution unit. A decryptor receives the encrypted data stream, extracts and decrypts the further unit and replaces the substitution unit with a regenerated first unit.

8 Claims, 5 Drawing Sheets

(56) References Cited

FOREIGN PATENT DOCUMENTS

| KR | 200656019 A | 6/2006 |
|---|---|---|
| WO | WO2009090253 | 7/2009 |
| WO | WO2010000727 | 1/2010 |
| WO | WO2010044146 | 4/2010 |

OTHER PUBLICATIONS

Massoudi et al., Secure and Low Cost Selective Encryption for JPEG2000, Tenth IEEE International Symposium on Multimedia, IEEE Computer Society, IEEE, 2008.

Shahid et al., "Selective Encryption of C2DVLC of AVS Video Coding Standard for I & P Frames", 2010 IEEE International Conference on Multimedia and Expo (ICME), Singapore, Jul. 19, 2010, pp. 1655-1660.

Brahimi et al., "Selective Encryption Techniques of JPEG2000 Codestream for Medical Images Transmission", WSEAS Transactions on Circuits and Systems, Jul. 2008, vol. 7, Iss. 7, pp. 718-727.

Lee et al., "Implementation of H.264 Transcoding & Selective Encryption of bit Stream", 11th International Conference on Advanced Communication Technology, Feb. 15, 2009, Gangwon-do, South Korea, pp. 1725-1728.

Bergeron et al., "Compliant selective encryption for H264/AVC video steams", Proceedings of the International Workshop on Multimedia Processing (MMSP'05), Shanghai, China, Oct. 30, 2005, pp. 477-480.

Jiang et al., "An Improved Selective Encryption for H264 Video based on Intra Prediction Mode Scrambling", Journal of Multimedia, vol. 5, No. 5, Oct. 2010, pp. 464-472.

Li et al., "A New Video Encryption Algorithm for H264", IEEE International Conference on Information, Communications and Signal Processing 2005, Bangkok, Thailand, Dec. 6, 2005, pp. 1121-1124.

Shahid et al., "Fast protection of H.264/AVC by selective encryption of CABAC for I & P Frames", 2009 European Signal Processing Conference, Glasgow, Scotland, Aug. 24, 2009, pp. 1-6.

Anonymous, "ITU-T H.264 Telecommunication Standardization Sector of ITU, Series H: Audiovisual and Multimedia Systems, Infrastructure of audiovisual services—Coding of moving Video, Advanced video coding for generic audiovisual services", Mar. 2009, pp. 1-670.

Nishimoto et al., "A Digital Video Scrambling Method with Variable Concealed Level for Stored Content", The Institute of Image Information and Television Engineers, vol. 31, No. 41, Jan. 2008, pp. 11-16. English Abstract.

Nakamura et al., "A Note on a Scrambling Scheme with Variable Concealed Level for MPEG bitstream", The Institute of Electronics, Information and Communication Engineers, Technical Report IT-95-48, vol. 95, No. 474, Jan. 1996, pp. 19-24. English Abstract.

* cited by examiner

METHODS AND DEVICES FOR SELECTIVE FORMAT-PRESERVING DATA ENCRYPTION

This application claims the benefit, under 35 U.S.C. §119 of EP Patent Application 11306136.0, filed 12 Sep. 2011.

FIELD OF THE INVENTION

The present invention relates generally to data encryption, and in particular to format compliant encryption of data organised in bit streams, especially H.264 bit streams.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

It has long been known to protect video data by encryption, notably in conditional access television systems. FIG. 1 illustrates a traditional prior art approach for content access control. The video signal CNT is first encoded 110 using a standard compression encoder, and the resulting bit stream CNT' is then encrypted 120 using a symmetric encryption standard (such as DES, AES, or IDEA). The encrypted bit stream [CNT'] is then received by a receiver that decrypts 130 the encrypted bit stream [CNT'] to obtain an encoded bit stream CNT' that is decoded 140 to obtain a video signal CNT that is, at least in theory, identical to the initial video signal. In this approach, called fully layered, compression and encryption are completely independent processes. The media bit stream is processed as classical plaintext data, with the assumption that all symbols or bits in the plaintext are of equal importance.

This scheme is relevant when the transmission of the content is unconstrained, but it seems inadequate in situations where resources (such as memory, power or computation capabilities) are limited. Much research shows the specific characteristic of image and video content: high transmission rate and limited allowed bandwidth, which justifies the inadequacy of standard cryptographic techniques for such content. This has led to researchers to explore a new scheme of securing the content—named "selective encryption", "partial encryption", "soft encryption", or "perceptual encryption"—by applying encryption to a subset of a bit stream with the expectation that the resulting partially encrypted bit stream is useless without the decryption of the encrypted subset.

An exemplary approach is to separate the content into two parts: the first part is the basic part of the signal (for example Direct Current, DC, coefficients in Discrete Cosine Transform, DCT, decomposition, or the low frequency layer in Discrete Wavelet Transform, DWT, decomposition), which allows the reconstruction of an intelligible, but low quality version of the original signal, and a second part that could be called the "enhancement" part (for example Alternating Current, AC, coefficients in DCT decomposition of an image, or high frequency layers in DWT), which allows the recovery of fine details of the image and reconstruction of a high quality version of the original signal. According to this new scheme, only the basic part is encrypted, while the enhancement part is sent unencrypted or in some cases with light-weight scrambling. The aim is to protect the content and not the binary stream itself.

FIG. 2 illustrates selective encryption according to the prior art. Encoding and decoding is performed as in FIG. 1. In selective encryption, the encoded bit stream CNT' is encrypted 220 depending on selective encryption parameters 240. These parameters may, as mentioned, for example state that the only the DC coefficients or the low frequency layer should be encrypted, while the rest of the encoded bit stream CNT' should be left unencrypted. The partially encrypted bit stream [CNT'] is then (partially) decrypted 230 depending on the selective encryption parameters 240.

As will be appreciated, selective encryption aims at reducing the amount of data to encrypt while achieving a sufficient and inexpensive security. Selective encryption of multimedia content addresses video data, audio data, still images or a combination thereof.

If compression is used, then selective encryption can be applied during compression, "in-compression", before compression, "pre-compression", or after compression, "post-compression".

WO 2010/000727 and "Selective Encryption of JPEG2000 Compressed Images with Minimum Encryption Ratio and Cryptographic Security", A. Massoudi, F. Lefebvre, C. De Vleeschouwer, F-O Devaux, IEEE describe a selective encryption method for JPEG2000 still images. The basic idea is to benefit from the fact that JPEG2000 data is uniformly distributed and that it therefore isn't necessary to encrypt an entire block of data for the protection to be efficient. If a k-bit encryption key is used, one may encrypt fewer bits and it is optimal to encrypt exactly k bits of the block. If more bits are encrypted, then a brute-force attack on the key is easier, if less is encrypted, then a brute-force attack on the encrypted part is easier, but exactly k bits falls exactly in the middle meaning that they are equally hard.

The mentioned encryption method is a post-compression scheme: the contextual arithmetic EBCOT (Embedded Block Coding with Optimal Truncation) coded data are totally (if the block length is exactly k bits) or partially encrypted.

WO 2009/090258 describes protection of a JPEG2000 bit stream. Packets are ordered according to a distortion-to-rate ratio. The transmitter then iteratively replaces the packet having the highest ratio with random data until a target distortion is achieved. In order to use the protected bit stream, the receiver requests the original packets from the transmitter and replaces the random packets with the original packets The goal is to perform selective encryption of the bit stream.

However, while the solutions work well for JPEG2000 data because the EBCOT compresses only signal data, it may be less suited for other signal formats.

For example, in H.264/MPEG-4 AVC the entropic coding is either Context-Adaptive Variable-Length Coding (CAVLC) or Context-based Adaptive Binary Arithmetic Coding (CABAC). In H.264, CABAC compresses signal data and header data. Header data are necessary for the H.264 parser to reconstruct the uncompressed data. If the CABAC data does not comply with the required format, then the parser fails and the decoder crashes.

A salient feature of H.264 is the use of a Network Abstraction Layer (NAL) that formats the so-called Video Coding Layer (VCL) into a kind of generic base from which network specific formats are generated.

FIG. 3 illustrates an exemplary H.264 stream structure 300. The H.264 stream structure 300 comprises a number of NAL units: Sequence Parameter Set (SPS), Picture Parameters Set (PPS), Instantaneous Decoding Refresh (IDR) Slice 1, Slice 2 310, Slice 3, another PPS . . . . The SPS and the PPS comprise various decoding parameters, the slices comprise image data and the IDR separates Groups of Pictures (GOPs) so that they are independent. Like the other slices, slice 2 310 comprises a header 312 and a body 314 comprising slice data. As will be appreciated encrypting a slice means that also the header (or a part of it) is encrypted and as this header is needed to interpret the NAL, such a scheme is doomed to fail.

The prior art provides some selective encryption solutions for H.264/MPEG-4 AVC.

In "Fast protection of H.264/AVC by selective encryption of CABAC", Z. Shahid, M. Chaumont, W. Puech, IEEE ICME, 2009, the authors propose to scramble the so-called Exp-Golomb code and the bit sign of quantized DCT coefficients. The Exp-Golomb code can be coded in a so-called "By Pass" mode, which means that the Exp-Golomb code does not affect the CABAC context. Thus, changing the Exp-Golomb code keeps the CABAC compliant with the H.264 standard.

The Exp-Golomb code is modified in "Compliant selective encryption for H264/AVC video steams", C. Bergeron, C. Lamy-Bergeot, Proceedings of the International Workshop on Multimedia Processing (MMSP '05), pp. 477-480, Shanghai, China, October-November 2005.

Other solutions scramble the Intra Prediction Mode. The level distortion depends on Intra Prediction Mode (IPM) frequencies. The scrambling space is limited in these in-compression schemes. See "An Improved Selective Encryption for H264 Video based on Intra Prediction Mode Scrambling", J. Jiang, Y Liu, Z. Su, G. Zhang and S. Xing, Journal of Multimedia, vol. 5, no. 5, October 2005, and "A New Video Encryption Algorithm for H264", Y. Li, L. Liang, Z. Su, J. Jiang, IEEE ICICS, 2005

In general, in-compression schemes suffer from some weaknesses. They are often time consuming and there is sometimes necessary to develop a new H.264 codec/parser as the solution is not complaint with the standard implementation.

In summary, it will be appreciated that the basic JPEG2000 solution cannot be modified to H.264 to scramble CABAC data since the required header data then are inaccessible before decryption. Modifying the CABAC without analysis is likely to crash the H.264 parser and cause the decoder to fail. The main alternatives propose to modify data before the CABAC or to modify the Exp-Colomb code.

Both alternatives have drawbacks, such as limitation of the scrambling space, difficulty to find the best tuning for expected visual degradation, non-standard H.264 codec, a scrambled stream that is non-compliant with the H.264 standard. Further, the bypass mode is often easily identified by an attacker and the scrambling can be prone to brute force attacks.

It can therefore be appreciated that there is a need for an improved selective encryption method for H.264 bit streams that ensures standard compliance. The present invention provides such a solution.

SUMMARY OF THE INVENTION

In a first aspect, the invention is directed to a method for format-compliant encryption of a bit stream having a format and comprising a plurality of units. An encryption device encrypts a first unit to obtain an encrypted unit, the first unit being of a first type; inserts the encrypted unit in a second unit of a second type compliant with the format; inserts the second unit into the bit stream; and inserts into the bit stream a substitution unit of the first type in the place of the first unit.

In a first preferred embodiment, data from the substitution unit is usable for substitution of further units of the first type.

In a second preferred embodiment, a unit of the first type comprises a header and a body, and the substitution unit for the first unit is obtained by combining header data from the first unit with header data and body data of a generic unit of the first type. It is advantageous that the format of the bit stream is compliant with H.264/MPEG-4 AVC and that the first unit is a slice comprising video data.

In a second aspect, the invention is directed to an encryption device for format-compliant encryption of a bit stream having a format and comprising a plurality of units. The encryption device comprises a processor adapted to: encrypt a first unit to obtain an encrypted unit, the first unit being of a first type; insert the encrypted unit in a second unit of a second type compliant with the format; insert the second unit into the bit stream; and insert into the bit stream a substitution unit of the first type in the place of the first unit.

In a third aspect, the invention is directed to a method for format-compliant decryption of an encrypted bit stream comprising a plurality of units. A decryption device obtains from the encrypted bit stream a second unit of a second type, the second unit comprising an encrypted unit; decrypts the encrypted unit to obtain decrypted data; and replaces in the encrypted bit stream a substitution unit of a first type with further unit of the first type, the further unit comprising at least some of the decrypted data.

In a first preferred embodiment, the second unit is obtained by removing the second unit from the encrypted bit stream.

In a second preferred embodiment, the decrypted data comprises header data and body data and the decryption device further generates the further unit by combining at least some of the header data and the body data of the decrypted data with header data of the substitution unit.

In a third preferred embodiment, the format of the bit stream is compliant with H.264/MPEG-4 AVC and the substitution unit and the further unit are slices comprising video data.

In a fourth aspect, the invention is directed to a decryption device for format-compliant decryption of an encrypted bit stream comprising a plurality of units. The decryption device comprises a processor adapted to: obtain from the encrypted bit stream a second unit of a second type, the second unit comprising an encrypted unit; decrypt the encrypted unit to obtain decrypted data; and replace in the encrypted bit stream a substitution unit of a first type with further unit of the first type, the further unit comprising at least some of the decrypted data.

In a first preferred embodiment, the second unit is part of the encrypted bit stream and the processor is further adapted to obtain the second unit by removing the second unit from the encrypted bit stream.

In a second preferred embodiment, the decrypted data comprises header data and body data and the processor is further adapted to generate the further unit by combining at least some of the header data and the body data of the decrypted data with header data of the substitution unit.

In a fifth aspect, the invention is directed to a computable readable storage medium comprising stored instructions that when executed by a processor performs the method of any embodiment of the second aspect.

BRIEF DESCRIPTION OF THE DRAWINGS

Preferred features of the present invention will now be described, by way of non-limiting example, with reference to the accompanying drawings, in which.

PREFERRED EMBODIMENT OF THE INVENTION

A main inventive idea of the present invention is to protect a NAL slice by encrypting it, putting the encrypted slice data into a 'new' unit and to replace the original slice by a 'dummy' slice that preferably is generic.

Figure 3:
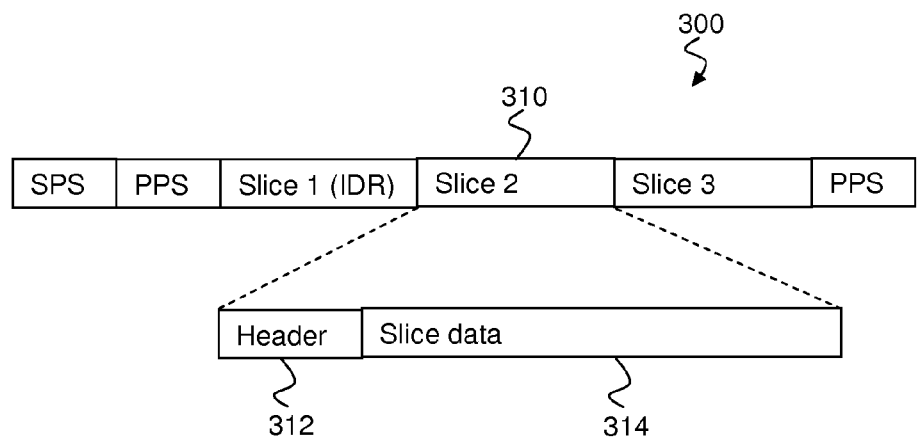
FIG. 3, already described herein, illustrates an exemplary prior art H.264 stream.
Figure 4:
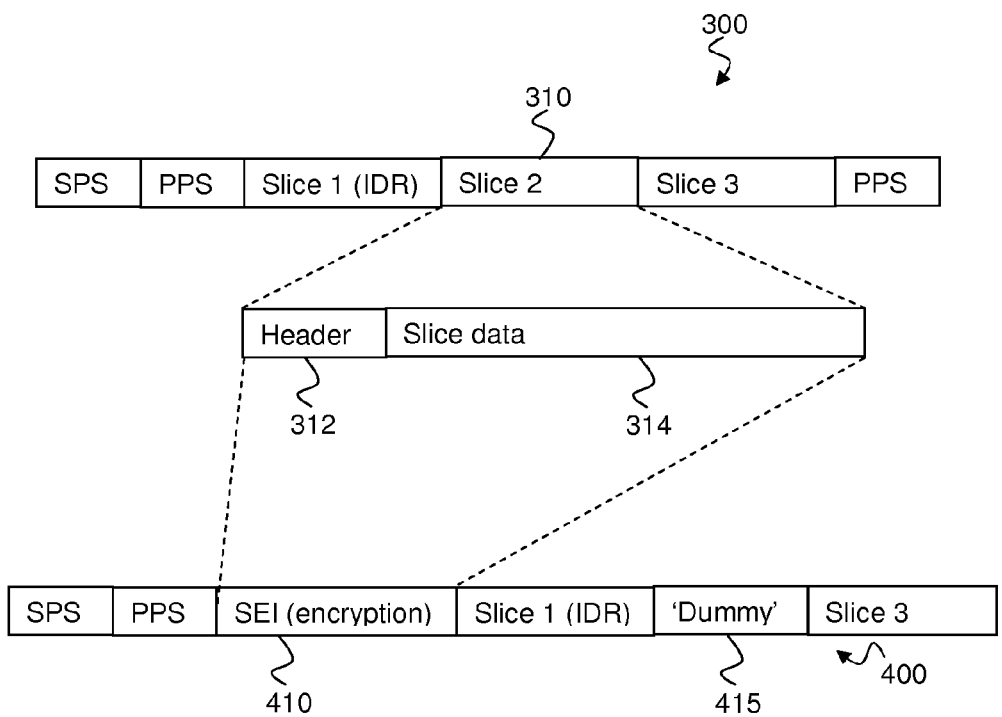
FIG. 4 illustrates the general inventive idea of the present invention.

FIG. 4 illustrates the general inventive idea of the present invention. In the Figure, an H.264 stream 300 illustrated in FIG. 3 is processed to generate an encrypted H.264 stream 400 by, as a non-limitative example, encryption of NAL Slice 2 310. At least the slice data in the body 314, but preferably also the slice header 312 (or part of it), is encrypted, preferably by encryption of all of the data therein, but it is also possible to encrypt part of the data. The encryption may be performed using any suitable prior art encryption algorithm such as Advanced Encryption Standard (AES), Blowfish or Triple DES. The slices to protect are preferably so-called I, P or B slices or a combination thereof, i.e. they comprise data corresponding to I, P or B frames. It will be appreciated that key distribution and so on are out of the scope of the present invention; it is assumed that both encryption device and decryption device have the correct encryption or decryption key.

The encrypted slice is then inserted in a format-preserving place, preferably before the original slice, as data in a Supplemental Enhancement Information (SEI) message 410 (preferably before all the slices between two PPS:s) and a 'dummy' slice 415 replaces original Slice 2 310. It is advantageous that the 'dummy' slice is as small as possible to reduce the overhead. The 'dummy' slice is preferably a standard-compliant slice with CABAC or CAVLC data.

Figure 1:
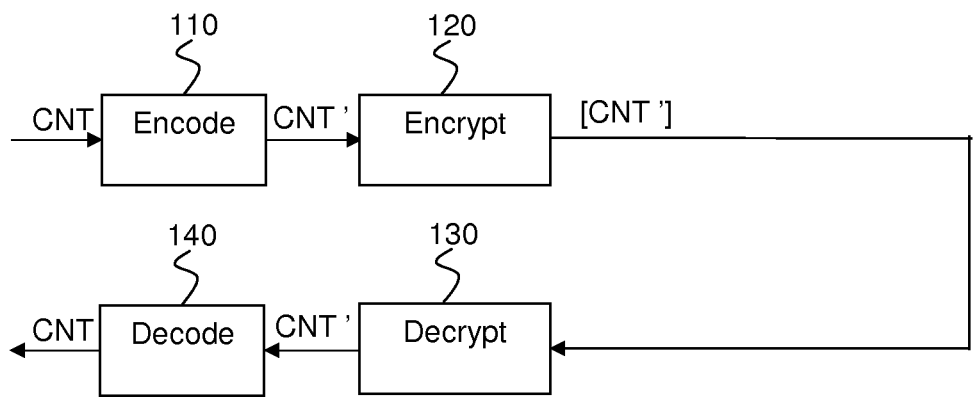
FIG. 1, already described herein, illustrates a traditional prior art approach for content access control.
Figure 2:
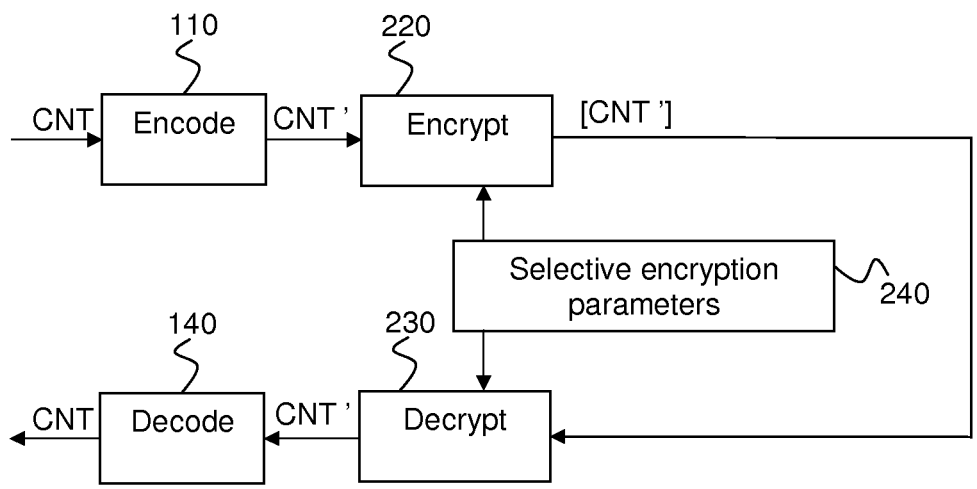
FIG. 2, already described herein, illustrates selective encryption according to the prior art.

The selective encryption parameters 240 in FIG. 2 may be pre-determined or implicit. They may also be communicated from sender to receiver, from receiver to sender or mutually agreed upon, but they may also be communicated from a third device to both sender and receiver.

It will be appreciated that the protected slice may also be placed elsewhere than in a SEI message, for example into external metadata that accompany the H.264 stream.

The details of the encryption scheme of the invention differ depending on whether it is an I slice or a P or a B slice that is encrypted, as will be seen hereinafter.

Depending on the type of slice-I, P or B-different possibilities present themselves.

For example, it is possible to replace a P or B CABAC slice by a skipped P or B CABAC slice. In this case, the slice type is preserved and the slice is replaced by a CABAC encoded slice comprising the number of skipped macroblocks. A skipped macroblock is a macroblock for which no data is explicitly encoded. It is reconstructed during decoding using information from macroblocks of adjacent frames as is well known in the art.

As the standard allows a mix of CABAC and CAVLC, it is however also possible to replace a P or B CABAC slice by skipped P or B CAVLC slice, i.e. by skipped macroblocks encoded with CAVLC. To do this, a new PPS (Picture Parameter Set) that sets the entropy encoder to CAVLC is needed. This adds about 5 bytes to the video stream (with, possibly, about 5 further bytes to switch back). It should be noted that several (consecutive) frames (each being made up of one or more slices) may follow the PPS. The CAVLC substitution slice takes about 3 bytes per encrypted slice for a 1920×1080 High Definition (HD) video, i.e. around 0.0001% of the original frame. The slice header contains information needed for the proper decoding of the slice data. When changing the coding mode of the slice, i.e. when switching to CAVLC encoding, some of these parameters have to be changed to allow proper operation of the decoder; these parameters comprise:

pic_parameter_set_id (sometimes called pps_id): id of the picture parameter set to be used for CAVLC encoding; and cabac_init_idc: used to initialize CABAC encoding; not required for CAVLC.

As these parameters are needed for the proper decoding of the CABAC encoded data at the receiver, these parameters are appended to the P or B slice data which is encrypted and inserted into the SEI.

Thereafter, the slice data contains only the number of skipped macroblocks encoded in exp-golomb.

An I CABAC slice may, as will be described in detail hereinafter, be replaced by a blank I CABAC slice, but it is also possible to replace the I CABAC slice by a skipped P (or B) CAVLC slice. In the latter case, the slice type is changed and the substitution slice is generated as when a P or B CABAC slice is replaced by a skipped P or B CAVLC slice. It should however be noted that this is not possible with an IDR frame as H.264 does not allow CAVLC data in such a frame.

Figure 5:
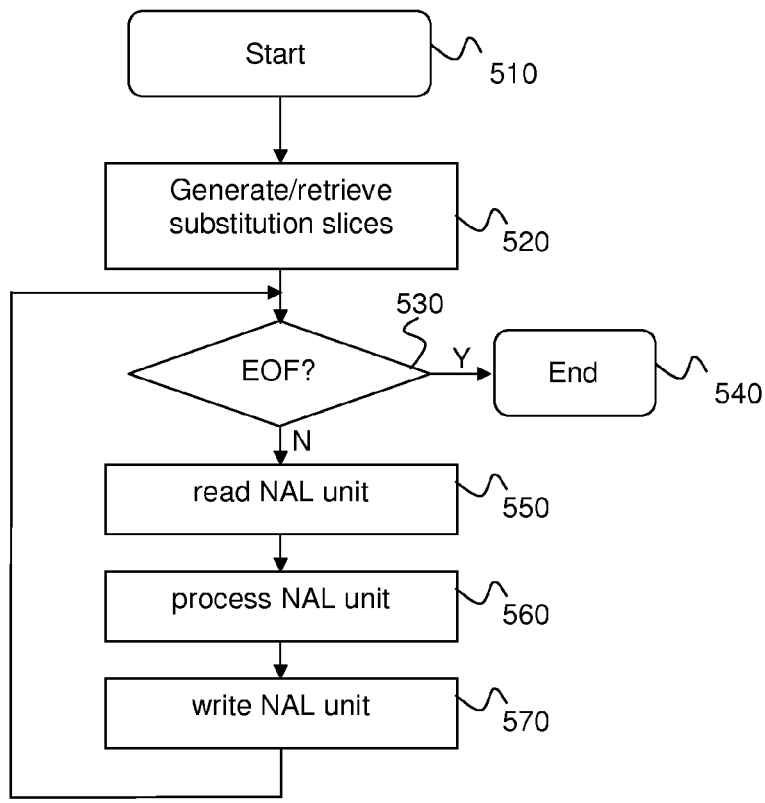
FIG. 5 illustrates a method for encryption of H.264 data according to a preferred embodiment of the present invention.

FIG. 5 illustrates a method for encryption of H.264 data according to a preferred embodiment of the present invention.

The basic idea is:

Encrypt at least some basic entities of the stream (advantageously slices) and transmit the encrypted entities as metadata (preferably in one or more SEI messages)

Replace these entities by 'dummy' data (called substitution slices). The substitution slices are chosen such that:
they are compliant with the standard; a non-compliant decoder won't crash; and
they preferably are of the smallest possible size An encryption device starts 510 the method. The device generates or retrieves 520 the substitution slices that will be used. In the preferred embodiment a P or B CABAC slice is replaced by a substitution P CABAC slice and an I CABAC slice is replaced by a substitution I CABAC slice.

The nature of the substitution slices depends of the type of slice (I, P/B). To generate such substitution slices for a H.264 content, the resolution, the YUV type (i.e. the colour space), the H.264 profile (i.e. one of Baseline (1), Main (2), Extended (3) and High Profile (4)) and level and the number of slices per frame are extracted for use during the generation of the substitution slices. As an example, a movie may have a High Definition (HD) resolution of 1920×1080, YUV 4:2:0 and be in High Profile Level 4.1 with one slice per frame. Then a raw YUV 4:2:0 file (i.e. same colour space) containing two 1920×1080 frames (i.e. same resolution) is created, the YUV values are set to 128 (which corresponds to a uniform gray movie, i.e. with the lowest entropy), and the YUV file is encoded with an encoder (such as x264) by forcing to High Profile Level 4.1 (i.e. the same profile). The parameters of the encoder are set so that the number of slices per frame and the slice dimension are identical to the original. The resulting H.264 video file contains one I frame and, depending on the encoder setting, one skipped P CABAC or CAVLC slice that will be used in the substitution slices. The PPS of this small stream carries: quantization parameter data ("slice_qp_delta") and CABAC initialization data ("cabac_init_idc"). In passing, for CAVLC, the file also comprises pps_id.

The slice header of an I slice comprises:

```
first_mb_in_slice
...
slice_qp_delta
if(slice_type==SP||slice_type==SI)
    if(slice_type==SP)
        sp_for_switch_flag
...
```

The header of a P or B slice also comprises the CABAC initialization data "cabac_init_idc".

A substitution I slice is generated as follows, where "original" indicates that the data is taken from the slice to protect and "generic" that the data is taken from the generated H.264 file:

```
first_mb_in_slice                       (original)
...
slice_qp_delta                          (generic)
if(slice_type==SP||slice_type==SI)      (original)
    if(slice_type==SP)                  (original)
        sp_for_switch_flag              (original)
...
byte alignment stuffing (if necessary)
CABAC encoded slice data                (generic)
```

For a substitution P slice, "cabac_init_idc" is taken from the H.264 file and put in its place before "slice_qp_delta"

It is then checked 530 if the End of File (EOF) of the H.264 stream is found. If this is the case, the method ends 540.

If the encryption device has not yet reached the EOF, then a NAL unit (the 'next' one) of the H.264 stream is read 550. If the unit is to be encrypted, then the NAL unit is processed 560 (i.e. encrypted) and the encrypted data is written into a particular SEI message (or in other metadata) and the appropriate substitution slice replaces the unit, step 570. The method then returns to step 530.

Figure 6:
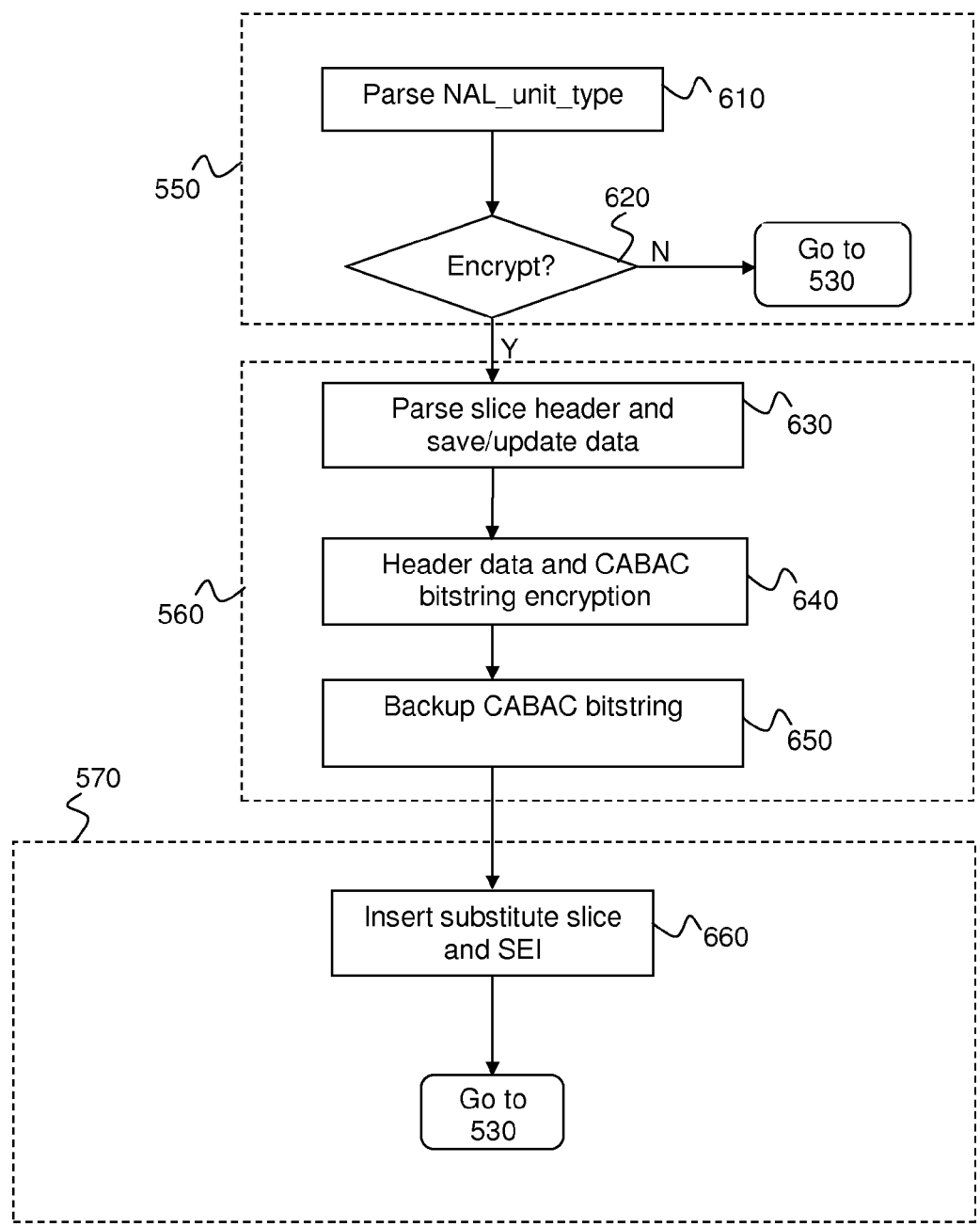
FIG. 6 illustrates a first part of a sub-step of the method illustrated in FIG. 5.

FIG. 6 illustrates the NAL unit reading 550, NAL unit processing 560 and NAL unit writing 570 steps of FIG. 5 in greater detail.

As the first substep of the NAL unit reading step 550, the NAL_unit_type is parsed 610 in order to determine the type of the present unit. In the preferred embodiment only slices are encrypted, so if the type of the present unit is a SPS, then the method moves to step 530 (not shown). The encryption device now knows if the slice is an I, a P or a B slice.

Then it is determined, step 620, if the slice is to be encrypted or not. The decision is based on predetermined requirements, such as "encrypt only I frames" and "encrypt P and B frames". If the slice is not to be encrypted, then the method moves on to step 530.

If the slice is to be encrypted, then the device parses the slice header and replaces, step 630, slice_qp_delta and if necessary cabac_init_idc and pps_id from substitution slice and saves original values.

Once the NAL unit has been read, the NAL unit is processed 560 by encrypting 640 the CABAC bitstring and saved original header values of the slice using AES-128. It is preferred to pad the bitstring with 0:s if it is shorter than 80 bits. The encrypted bitstring is then placed 650 into a SEI message (pre-existing or created).

Then, in step 660, the substitution slice is inserted in the place of the original slice.

The original slice has then been properly protected and the method goes back to step 530.

Figure 7:
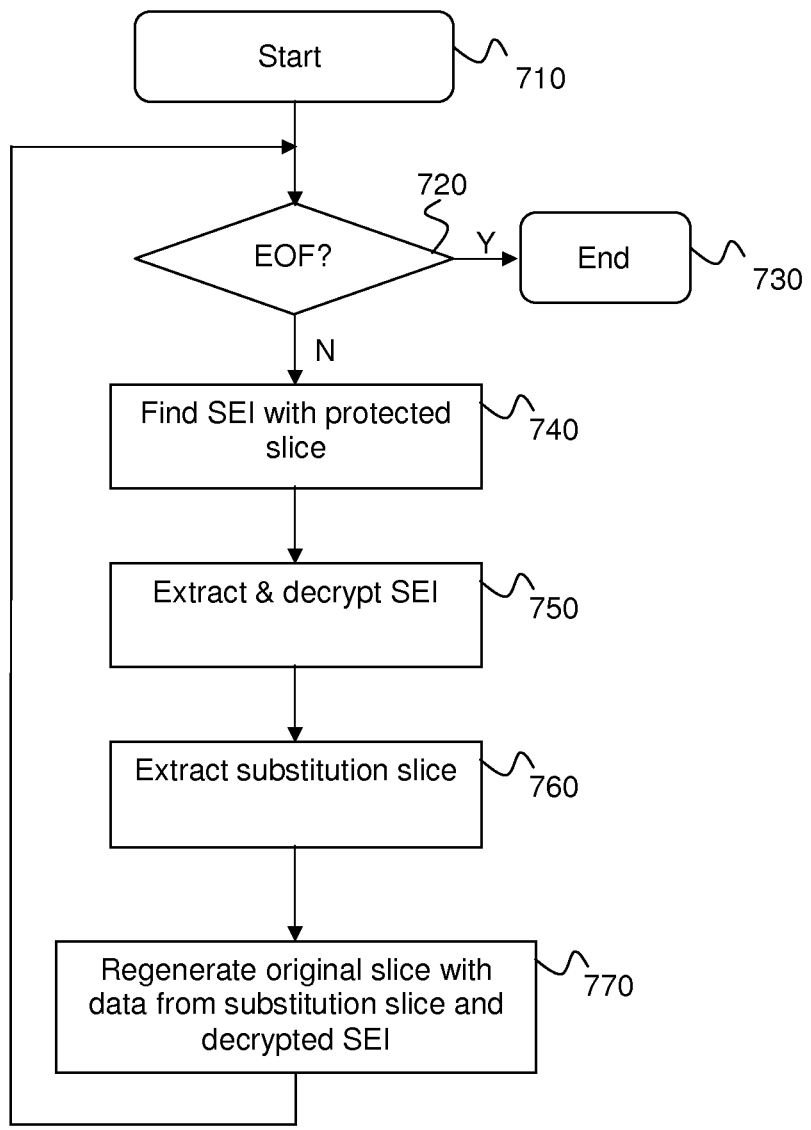
FIG. 7 illustrates a method for decryption of a protected H.264 video stream according to a preferred embodiment of the present invention.

FIG. 7 illustrates a method for decryption of a protected H.264 video stream according to a preferred embodiment of the present invention.

When the method starts, step 710, it is checked, step 720, if the End of file has been reached. If this is the case, the method ends, step 730.

If this is not the case, then the video stream is scanned (preferably from the beginning towards the end) for a SEI that comprises encrypted slice data, step 740. It is advantageous to have some kind of indicator in the SEI to signal that the SEI comprises encrypted slice data.

The found SEI is then extracted and decrypted, step 750, to generate decrypted slice data. It can be advantageous to remove the SEI from the H.264 stream at this time.

In step 760, the corresponding substitution slice is extracted. Then, in step 770, the decrypted slice data is put in the place of the substitution data and original decrypted header data are restored into the substitution slice header. When the slice has been decrypted and put back in the stream, the method returns to step 720 where it is verified if the stream has ended.

Figure 8:
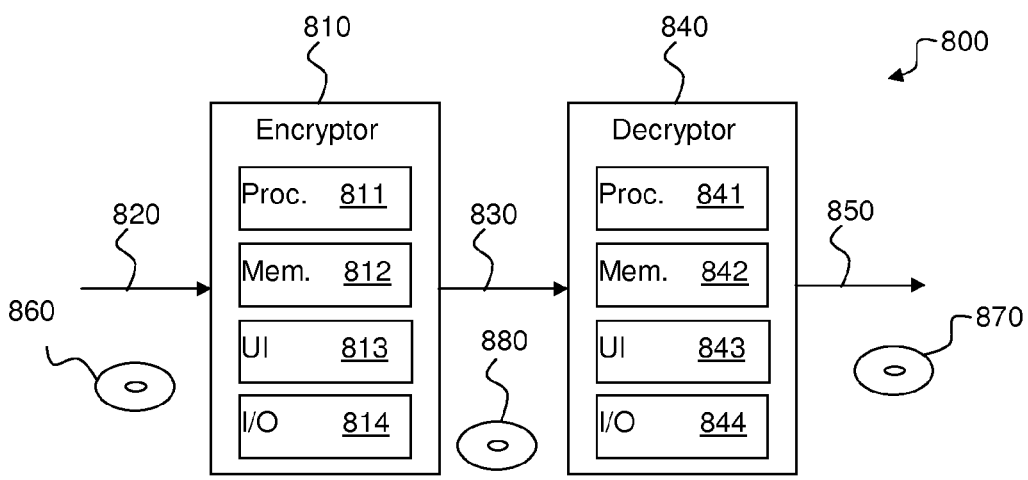
FIG. 8 illustrates apparatuses for encryption and decryption of a H.264 video stream according to a preferred embodiment of the present invention.

FIG. 8 illustrates a system 800 for encryption and decryption of a H.264 video stream according to a preferred embodiment of the present invention. The system 800 comprises an encryption device 810 and a decryption device 840, each comprising at least one processor 811, 841, memory 812, 842, preferably a user interface 813, 843, and at least one input/output unit 814, 844. The encryption device 810 may for example be a personal computer or a workstation, and it advantageously also has decryption functionality.

A first computable readable storage medium 860 comprises stored instructions that when executed by the processor 811 of the encryption device 810 encrypts a H.264 stream. A second computable readable storage medium 870 comprises stored instructions that when executed by the processor 841 of the decryption device 840 decrypts an encrypted H.264 stream as described. A third computable readable storage medium 880 comprises an encrypted H.264 stream, encrypted as described herein.

The skilled person will appreciate that the general scheme of the present invention can work for standard-compliant encryption and decryption of data compliant with other standards such as Scalable Video Coding (SVC), Multiview Video Coding (MVC) and HyperText Markup Language 5 (HTML-5).

It will be appreciated that the security depends only on the length of original slice to encrypt, the length of the key and the choice of the encryption algorithm. For AES, it is preferred that the length of the key is at least 128 bits and the length of the original slice at least 80 bits; in case the original slice is shorter than 80 bits, it is padded using any suitable prior art padding technique until it becomes 128 bits long.

It will thus be appreciated that the present invention can provide format-compliant encryption, in particular of H.264 streams, that can provide one or more of the following characteristics:

Low overhead: 5b+4b/protected frame.
Tuneable level of distortion by selection of frames to encrypt: I, P and/or B.
Fast decryption.
The scheme is post compression and does not affect the compression scheme
The h264 file format is compliant with the standard. The decoding of a scrambled stream does not disturb a standard H264 player.
Error tolerance. Scrambled or not, the decoder manages errors in the same way and errors will be propagated in the same way.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method for format-compliant encryption of an H.264/MPEG-4 AVC compliant bit stream comprising a plurality of units, the method comprising:
    determining, using at least one processor, a type of a first unit of the H.264/MPEG-4 AVC compliant bit stream;
    when the first unit is a first type, encrypting, using the at least one processor, the first unit of the H.264/MPEG-4 AVC compliant bit stream to obtain an encrypted unit;
    inserting, using the at least one processor, the encrypted unit in a second unit, the second unit being of a second type compliant with H.264/MPEG-4 AVC;
    inserting, using the at least one processor, the second unit into the bit stream; and
    inserting, using the at least one processor, into the bit stream a substitution unit of the first type in place of the first unit, wherein a unit of the first type comprises a header and a body; and
    obtaining, using the at least one processor, the substitution unit for the first unit by combining header data from the first unit with header data and body data of a generic unit of the first type.

2. The method of claim 1, wherein data from the substitution unit is usable for substitution of further units of the first type.

3. The method of claim 1, wherein the first unit is a slice comprising video data.

4. An encryption device for format-compliant encryption of an H.264/MPEG-4 AVC compliant bit stream comprising a plurality of units, the encryption device comprising a processor configured to:
    determine a type of a first unit of the H.264/MPEG-4 AVC compliant bit stream;
    when the first unit is a first type, encrypt the first unit of the H.264/MPEG-4 AVC compliant bit stream to obtain an encrypted unit;
    insert the encrypted unit in a second unit, the second unit being of a second type compliant with H.264/MPEG-4 AVC;
    insert the second unit into the bit stream; and
    insert into the bit stream a substitution unit of the first type in place of the first unit, wherein a unit of the first type comprises a header and a body; and
    obtain the substitution unit for the first unit by combining header data from the first unit with header data and body data of a generic unit of the first type.

5. A method for format-compliant decryption of an encrypted bit stream comprising a plurality of units, the method comprising:
    obtaining, using at least one processor, from the encrypted bit stream a second unit of a second type by removing the second unit from the encrypted bit stream, the second unit comprising an encrypted unit, the bit stream being compliant with H.264/MPEG-4 AVC;
    decrypting, using the at least one processor, the encrypted unit to obtain decrypted data, the decrypted data comprising header data and body data;
    replacing, using the at least one processor, in the encrypted bit stream a substitution unit of a first type with a further unit of the first type, the further unit comprising at least some of the decrypted data; and
    combining, using the at least one processor, at least some of the header data and the body data of the decrypted data with header data of the substitution unit.

6. The method of claim 5, wherein the substitution unit and the further unit are slices comprising video data.

7. A decryption device for format-compliant decryption of an encrypted bit stream comprising a plurality of units, the decryption device comprising a processor configured to:
    remove a second unit of a second type from the encrypted bit stream to obtain from the encrypted bit stream the second unit, the second unit comprising an encrypted unit, the bit stream being compliant with H.264/MPEG-4 AVC;
    decrypt the encrypted unit to obtain decrypted data, the decrypted data comprising header data and body data;
    replace in the encrypted bit stream a substitution unit of a first type with a further unit of the first type, the further unit comprising at least some of the decrypted data; and
    combine at least some of the header data and the body data of the decrypted data with header data of the substitution unit.

8. A non-transitory computer readable storage medium comprising stored instructions that when executed by a processor, performs a method for format-compliant decryption of an encrypted bit stream comprising a plurality of units, the method comprising:
    obtaining from the encrypted bit stream a second unit of a second type by removing the second unit from the encrypted bit stream, the second unit comprising an encrypted unit, the bit stream being compliant with H.264/MPEG AVC;
    decrypting the encrypted unit to obtain decrypted data, the decrypted data comprising header data and body data;

replacing in the encrypted bit stream a substitution unit of a first type with a further unit of the first type, the further unit comprising at least some of the decrypted data; and combining at least some of the header data and the body data of the decrypted data with header data of the substitution unit.

* * * * *